(12) United States Patent
Puthiyedath

(10) Patent No.: US 10,657,068 B2
(45) Date of Patent: May 19, 2020

(54) TECHNIQUES FOR AN ALL PERSISTENT MEMORY FILE SYSTEM

(71) Applicant: Intel Corporation, Santa Clara, CA (US)

(72) Inventor: Leena K. Puthiyedath, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/928,699

(22) Filed: Mar. 22, 2018

(65) Prior Publication Data

US 2019/0050344 A1 Feb. 14, 2019

(51) Int. Cl.
*G06F 3/06* (2006.01)
*G06F 12/109* (2016.01)
*G06F 12/06* (2006.01)

(52) U.S. Cl.
CPC ........ *G06F 12/109* (2013.01); *G06F 12/0653* (2013.01); *G06F 2212/1032* (2013.01); *G06F 2212/202* (2013.01); *G06F 2212/657* (2013.01)

(58) Field of Classification Search
CPC .... G06F 12/10; G06F 12/109; G06F 2212/20; G06F 2212/202–206; G06F 2212/65; G06F 2212/657
See application file for complete search history.

(56) References Cited

U.S. PATENT DOCUMENTS

| | | | | |
|---|---|---|---|---|
| 6,754,771 B2* | 6/2004 | Vincent | ................... | G06F 12/08 703/22 |
| 7,165,137 B2* | 1/2007 | Chang | ................... | G06F 9/4403 710/200 |
| 7,624,240 B1* | 11/2009 | Colbert | ................. | G06F 9/4856 711/159 |
| 7,971,015 B2* | 6/2011 | Waldspurger | ....... | G06F 11/1438 711/162 |
| 8,255,651 B2* | 8/2012 | Liu | ........................ | G06F 3/0482 711/162 |
| 9,311,375 B1* | 4/2016 | Naik | ..................... | G06F 16/275 |
| 9,652,405 B1* | 5/2017 | Shain | .................... | G06F 12/122 |
| 9,703,582 B1* | 7/2017 | Chigurapati | ........ | G06F 9/45533 |
| 2004/0064668 A1 | 4/2004 | Kjos et al. | | |
| 2006/0041731 A1* | 2/2006 | Jochemsen | ......... | G06F 12/0223 711/170 |

(Continued)

FOREIGN PATENT DOCUMENTS

WO 2015156830 A1 10/2015

OTHER PUBLICATIONS

Bruce R. Millar, Runtime Support and Storage Management for Memory-Mapped Persistent Objects, IEEE 1993 (Year: 1993).*
Vasily A. Sartakov, Arthur Martens, Rudiger Kapitza, Temporality a NVRAM-based virtualization platform. 2015 IEEE 34th Symposium on Reliable Distributed Systems. (Year: 2015).*
Advisory Action for U.S. Appl. No. 15/200,857, dated Jun. 26, 2018, 3 pages.
Office Action for U.S. Appl. No. 15/200,857, dated Nov. 2, 2018, 18 pages.

(Continued)

*Primary Examiner* — Khoa D Doan
(74) *Attorney, Agent, or Firm* — Compass IP Law PC

(57) ABSTRACT

Examples may include techniques for an all persistent memory file system. The techniques to include allocating physical memory pages of memory devices of a persistent memory platform coupled with a computing platform. The techniques to also include storing context or relocated files to persistent memory physical address spaces for the memory devices and mapping process virtual address spaces for a working set associated with one or more instantiations of a program by circuitry at the computing platform.

26 Claims, 9 Drawing Sheets

(56) References Cited

U.S. PATENT DOCUMENTS

| | | |
|---|---|---|
| 2008/0005529 A1 | 1/2008 | Morris |
| 2008/0022065 A1* | 1/2008 | Gutti .................... G06F 12/145 |
| | | 711/170 |
| 2010/0037024 A1 | 2/2010 | Brewer et al. |
| 2013/0227236 A1 | 8/2013 | Flynn et al. |
| 2014/0195564 A1 | 7/2014 | Talagala et al. |
| 2015/0227469 A1 | 8/2015 | Zyulkyarov et al. |
| 2015/0242437 A1* | 8/2015 | Lee ...................... G06F 16/182 |
| | | 707/827 |
| 2015/0254256 A1 | 9/2015 | Laurent et al. |
| 2015/0355981 A1 | 12/2015 | Booss et al. |
| 2016/0004721 A1* | 1/2016 | Iyer ...................... G06F 16/128 |
| | | 707/649 |
| 2016/0019138 A1* | 1/2016 | Lee ...................... G06F 3/0685 |
| | | 711/103 |

OTHER PUBLICATIONS

International Search Report and Written Opinion for PCT Patent Application No. PCT/US2017/035043, dated Sep. 6, 2017, 12 pages.

Office Action for U.S. Appl. No. 15/200,857, dated Aug. 28, 2017, 19 pages.

Final Office Action for U.S. Appl. No. 15/200,857, dated Apr. 4, 2018, 18 pages.

Final Office Action for U.S. Appl. No. 15/200,857, dated May 29, 2019, 17 pages.

Office Action for U.S. Appl. No. 15/200,857, dated Nov. 22, 2019, 17 pages.

* cited by examiner

700

ALLOCATE A FIRST PORTION OF PERSISTENT MEMORY PHYSICAL PAGES OF ONE OR MORE MEMORY DEVICES OF THE PERSISTENT MEMORY PLATFORM FOR A FIRST PROCESSING WORKING SET OF A FIRST INSTANTIATION OF THE PROGRAM, THE ALLOCATED FIRST PORTION OF THE PERSISTENT MEMORY PHYSICAL PAGES OBTAINED FROM A PERSISTENT MEMORY PHYSICAL ADDRESS SPACE FOR THE ONE OR MORE MEMORY DEVICES
702

STORE CONTEXT SPECIFIC DATA FOR THE FIRST PROCESSING WORKING SET IN A FIRST CONTEXT FILE, THE FIRST CONTEXT FILE INCLUDING A FIRST FILE OFFSET TO AT LEAST ONE PERSISTENT MEMORY PHYSICAL ADDRESS SPACE OF THE PERSISTENT PHYSICAL MEMORY ADDRESS SPACE, THE FIRST CONTEXT FILE STORED IN A FILE FORMAT THAT IS DIRECTLY EXECUTABLE BY A FIRST CIRCUITRY AT THE COMPUTING PLATFORM
704

MAP A FIRST PORTION OF A FIRST PROCESS VIRTUAL ADDRESS SPACE FOR THE FIRST PROCESSING WORKING SET TO THE AT LEAST ONE PERSISTENT MEMORY ADDRESS SPACE USING THE FIRST FILE OFFSET AS A REFERENCE TO THE FIRST CONTEXT FILE
706

ALLOCATE A SECOND PORTION OF THE PERSISTENT PHYSICAL MEMORY PAGES OF THE ONE OR MORE MEMORY DEVICES OF THE PERSISTENT MEMORY PLATFORM FOR THE FIRST PROCESSING WORKING SET OF THE FIRST INSTANTIATION OF THE PROGRAM, THE ALLOCATED SECOND PORTION OF THE PERSISTENT MEMORY PHYSICAL PAGES OBTAINED FROM THE PERSISTENT MEMORY PHYSICAL ADDRESS SPACE
708

STORE NON-CONTEXT SPECIFIC DATA FOR THE FIRST PROCESSING WORKING SET IN ONE OR MORE RELOCATABLE FILES, THE ONE OR MORE RELOCATABLE FILE SEPARATELY INCLUDING FILE OFFSETS TO RESPECTIVE PERSISTENT MEMORY PHYSICAL ADDRESS SPACES OF THE PERSISTENT PHYSICAL MEMORY ADDRESS SPACE, THE ONE OR MORE RELOCATABLE FILES STORED IN A FILE FORMAT THAT IS DIRECTLY EXECUTABLE BY THE FIRST CIRCUITRY AT THE COMPUTING PLATFORM
710

MAP A SECOND PORTION OF THE FIRST PROCESS VIRTUAL ADDRESS SPACE FOR THE FIRST PROCESSING WORKING SET TO THE RESPECTIVE PERSISTENT MEMORY ADDRESS SPACES USING AT LEAST ONE OF THE FILE OFFSETS AS A REFERENCE TO THE ONE OR MORE RELOCATABLE FILES
712

FIG. 7

Storage Medium 800

*Computer Executable Instructions for 700*

FIG. 8

TECHNIQUES FOR AN ALL PERSISTENT MEMORY FILE SYSTEM

TECHNICAL FIELD

Examples described herein are generally related to use of persistent memory in a computing system.

BACKGROUND

Persistent memory may be characterized as a way to store data structures such that the data structures may continue to be accessible using memory instructions or memory application programming interfaces (APIs) even after the process that created or last modified the data structures ends. Persistent memory may be accessed in a similar manner to types of volatile memory used for system memory of a computing system (e.g., dynamic random access memory (DRAM)), but it retains stored data structures across power loss in a similar manner to computer storage (e.g., hard disk drives or solid state drives). Persistent memory capabilities extend beyond an ability to retain stored data structures associated with program/system states across system power transitions (e.g., power loss to power restore). Key metadata may also need to be retained across system power transitions.

BRIEF DESCRIPTION OF THE DRAWINGS

FIG. 7 illustrates an example logic flow.
FIG. 8 illustrates an example storage medium.

DETAILED DESCRIPTION

Figure 1:
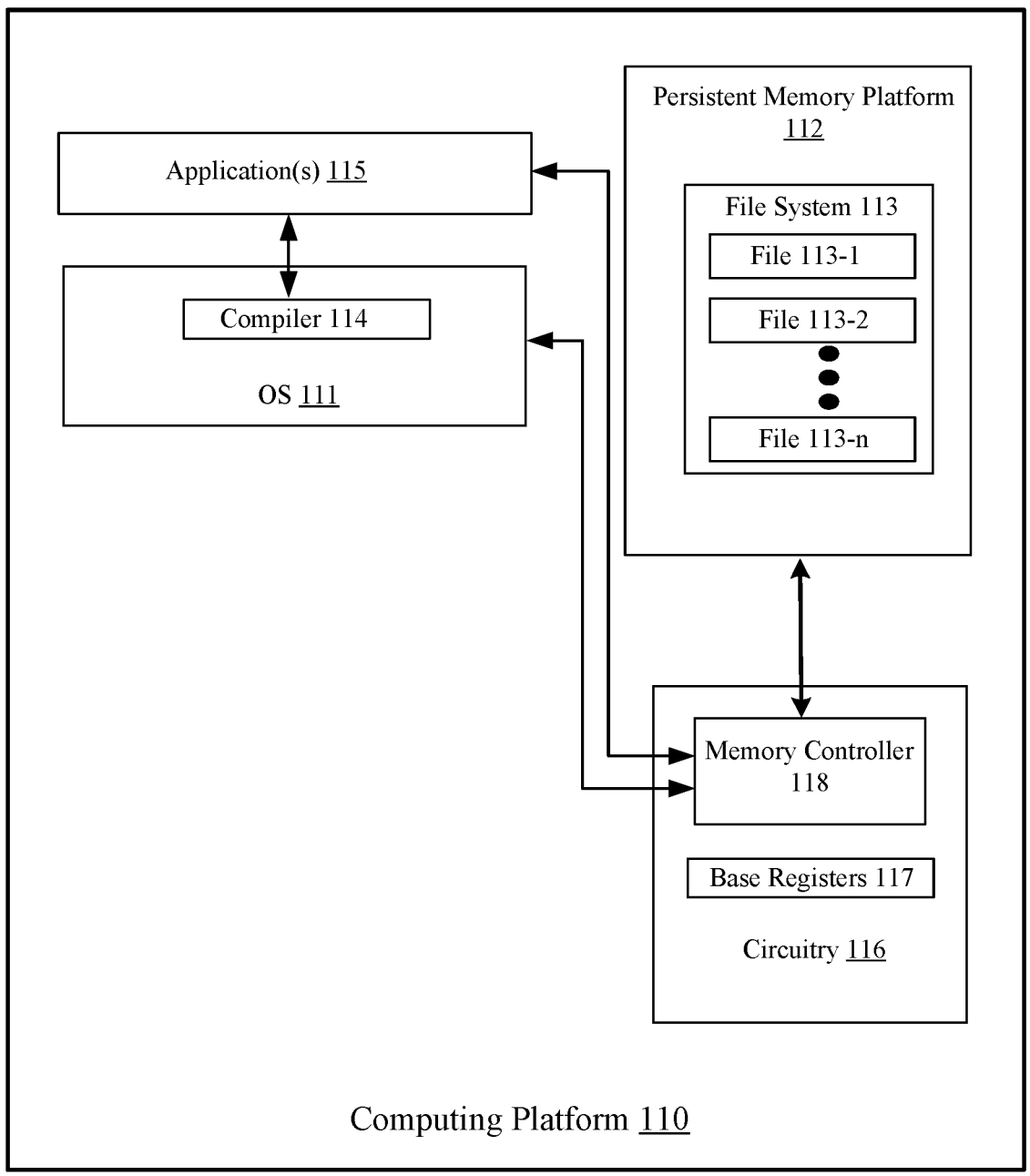
FIG. 1 illustrates an example system.

Computing systems may utilize memory representations of a data structure that has references or pointers that may be tied to a state of a process instance or process context for applications being executed by compute resources of these computing systems. The memory representation of the data structure may include, but is not limited to, a graph or a binary search tree (BST) that has a linked list with references or pointers in a process virtual address space. Typically, to store the data structure to a file, the memory representation of the data structure needs to be transformed into a serialized format.

Transforming a memory representation of a data structure into a serialized format may be due to storage devices arranged to store a file for the data structure being on an input/output bus that may provide only a block address granularity to computing systems coupled to the input/output buses. Meanwhile, system memory for computing systems may operate using a cache line or byte address granularity access with central processing unit (CPU) load/store instructions. Transforming the memory representation of the data structure to the serialized format may be referred to as serialization or marshalling. In some examples, to execute code for a stored file, the stored file needs to be transformed (de-serialized or un-marshalled) back to the memory representation of the data structure. Some data structures may have a high complexity and serialization/deserialization of these complex data structures may consume computing system resources such as CPU compute cycles, memory capacity and input/output bandwidth.

According to some examples, persistent memory aware file systems may allow a mapping of files in to a process virtual address space associated with a process context. A value attributed to this type of mapping is that copying data in a file from a storage device directly to system memory may avoid using memory buffers. However, if a file format is not a same file format as a memory representation of the data, the value of direct mapping may be reduced since the data may need to be de-serialized which may require use of memory buffers.

Memory buffers used due to different file formats may include volatile types of memory (e.g., DRAM). Volatile types of memory such as DRAM have typically been used to hold a program state at run time when executing instructions, generating, consuming and transforming data. Software use of memory and storage in computing platforms of today have been limited to match characteristics of today's predominant types of memory media used for system memory. These predominate types of memory media, such as volatile DRAM, have fast random access but don't retain program/system states without power and may also have relatively small capacities to maintain data. Also, predominate types of memory media used for storage, such as non-volatile memory, have a relatively large capacity to maintain data but may use slow block access schemes.

Software or applications may use system memory to maintain data in files for run time, per context state and may use storage as a repository of data maintained in flat sequential format files. New types of non-volatile memory are being developed. The new types of non-volatile memory may include random access, persistent memory media that may be nearly as fast as some types of volatile memory such as DRAM. These new types of non-volatile memory may enable software or applications to replace different file systems for memory and storage. This replacement of different file systems has clear advantages in that data transformation from a run time computationally native state in system memory to flat persistent file formats imposes transformation costs that may be incurred frequently. For example, every context creation and termination associated with stopping or starting an instantiation of a program or application. These costs may show up in program/application start times, in poor run time responsiveness or increased power/battery life drain for computing platforms subject to these transformation costs. All of which may result in a reduced end user experience and/or reduced computing platform performance.

FIG. 1 illustrates an example system 100. In some examples, as shown in FIG. 1, system 100 includes a computing platform 110. Also, as shown in FIG. 1, computing platform 110 may include an Operating System (OS) 111, a persistent memory platform 112, circuitry 116, and one or more application(s) 115. For these examples, circuitry 116 may be capable of executing various functional elements of computing platform 110 such as OS 111 and application(s) 115 that may be maintained, at least in part, within memory device(s) included in persistent memory platform 112. Circuitry 116 may be processing circuitry that includes one or more central processing units (CPUs) and associated chipsets and/or controllers.

According to some examples, computing platform 110 may include, but is not limited to, a server, a server array or server farm, a web server, a network server, an Internet server, a work station, a mini-computer, a main frame computer, a supercomputer, a network appliance, a web appliance, a desk top computer, a laptop computer, a notebook computer, a handheld computing device, a distributed computing system, multiprocessor systems, processor-based systems, or combination thereof.

According to some examples, as shown in FIG. 1, circuitry 116 may couple to persistent memory platform 112. Persistent memory platform 112 may be composed of one or more memory devices or dies (not shown) which may include various types of volatile and/or non-volatile memory. Volatile types of memory may include, but are not limited to, random-access memory (RAM), Dynamic RAM (DRAM), double data rate synchronous dynamic RAM (DDR SDRAM), static random-access memory (SRAM), thyristor RAM (T-RAM) or zero-capacitor RAM (Z-RAM). Non-volatile types of memory may include byte or block addressable types of non-volatile memory having a 3-dimensional (3-D) cross-point memory structure that includes, but is not limited to, chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), anti-ferroelectric memory, resistive memory including a metal oxide base, an oxygen vacancy base and a conductive bridge random access memory (CB-RAM), a spintronic magnetic junction memory, a magnetic tunneling junction (MTJ) memory, a domain wall (DW) and spin orbit transfer (SOT) memory, a thyristor based memory, a magnetoresistive random access memory (MRAM) that incorporates memristor technology, spin transfer torque MRAM (STT-MRAM), or a combination of any of the above.

In some examples, as shown in FIG. 1, persistent memory platform 112 may maintain a file system 113. In some examples, as described in more detail below, persistent memory platform 112 may maintain or include logic and/or features (e.g., a memory manager) to utilize a file system such as file system 113 to access physical memory pages maintained at one or more memory devices included in persistent memory platform 112. Use of file system 113 may include at least temporary storage of context or non-context specific data associated with one or more instantiations of application(s) 115. The context or non-context specific data for example, may be stored in a memory representation of a data structure in a file from among files 113-1 to 113-n, where "n" is any whole positive integer >1. The memory representation of the data structure, for example, may include a directly executable "native" format that may be directly executable by circuitry 116. This directly executable native format may eliminate a need to transform data or information stored to memory devices of persistent memory platform 112 from flat sequential format files to a memory representation of the data structure. Thus, improving application start times and increasing responsiveness for application(s) 115 being executed by circuitry 116.

In some examples, as described in more detail below, files 113-1 to 113-n may be formatted such that a persistent memory file representation of a data structure may be included in files 113-1 to 113-n based on a compiler such as a compiler 114 shown in FIG. 1 as being included in OS 111. For these examples compiler 114 may generate file offsets for respective data structures to be included in files 113-1 to 113-n that may then be stored to physical persistent memory pages maintained in one or more memory devices of persistent memory platform 112. For example, these file offsets may be associated with pointers or references to a process virtual address space via which a memory representation of the data structure for one or more applications such as application(s) 115 (e.g., representing application-specific context information) may be maintained. The process virtual address space may be further mapped to distributed pages in physical persistent memory at one or more memory devices of persistent memory platform 112.

Alternatively, in other examples, files 113-1 to 113-n may be formatted based on registers such as base registers 117 that may be located with or maintained by circuitry 116. Circuitry 116 may utilize base registers 117 along with instructions (e.g., CPU instructions) to de-reference pointers to determine file offsets for the data structure included in files 113-1 to 113-n that may then be stored to physical persistent memory pages maintained at memory device(s) 122. The de-referenced pointers may have been pointers to a process virtual address space via which a memory representation of the data structure for one or more application(s) such as application(s) 115 may be mapped to distributed pages in a persistent memory address space for one or more memory devices of persistent memory platform 112.

According to some examples, as shown in FIG. 1, circuitry 116 may include a memory controller 118. Memory controller 118 may be arranged to control access to data (e.g., associated with data structures of files) at least temporarily stored in memory devices of persistent memory platform 112. Communications between logic and/or features of memory devices included in persistent memory platform 112 (e.g., controllers) and memory controller 118 for accessing files 113-1 to 113-n stored to these memory devices may be routed through I/O interfaces (not shown). These I/O interfaces may include at least one I/O interface arranged as a Peripheral Component Interconnect Express (PCIe) interface to couple elements of circuitry 116 to elements of persistent memory platform 112. These I/O interfaces may also include at least one I/O interface arranged as a Non-Volatile Memory Express (NVMe) interface to couple elements of circuity 116 to elements of persistent memory platform 112. Communication protocols utilized to communicate through these I/O interfaces may be as described in industry standards or specifications (including progenies or variants) such as the Peripheral Component Interconnect (PCI) Express Base Specification, revision 4.0, version 1.0, published in October 2017 ("PCI Express specification" or "PCIe specification") and/or the Non-Volatile Memory Express (NVMe) Specification, revision 1.3a, published in October 2017 ("NVMe specification"). Although PCIe or NVMe interfaces may typically involve block storage of data, in some examples, data structures or files stored to memory devices of persistent memory platform 112 may be paged in to memory devices of persistent memory platform 112 when accessed by circuitry 116.

According to some examples, at least some of the one or more memory devices included in persistent memory platform 112 may be designed to operate in accordance with various memory technologies. The various memory technologies may include, but are not limited to, DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WI02 (Wide I/O 2 (WideIO2), JESD229-2, originally published by JEDEC in August 2014), HBM (HIGH BANDWIDTH MEMORY DRAM, JESD235, originally published by JEDEC in October 2013), HBM2, version 2, JESD235A, originally published by JEDEC in January 2016, and/or other technologies based on derivatives or extensions of such specifications. The various memory technologies may also include memory technologies currently in development that may include, but are not limited to, DDR5 (DDR version 5, currently in discussion by JEDEC), LPDDR5 (LPDDR version 5, currently in discussion by JEDEC), HBM3 (HBM version 3, currently in discussion by JEDEC), and/or other new technologies based on derivatives or extensions of these developing memory technologies.

According to some examples, at least some the one or more memory devices of persistent memory platform 112 may be located on one or more dual in-line memory modules (DIMMs). These DIMMs may be designed to function as a registered DIMM (RDIMM), a load reduced DIMM (LRDIMM), a fully-buffered DIMM (FB-DIMM), an unbuffered DIMM (UDIMM) or a small outline (SODIMM). Examples are not limited to only these DIMM designs.

In some examples, at least some memory devices of persistent memory platform 112 maintained on one or more DIMMs may include all or combinations of types of volatile or non-volatile memory. For example, memory devices of a first type of DIMM may include volatile memory on a front or first side and may include non-volatile memory on a back or second side. In other examples, a second type of DIMM may include combinations of non-volatile and volatile types of memory on either side of this second type of DIMM. In other examples, all memory devices on a given DIMM may be either volatile types of memory or non-volatile types of memory. In other examples, a third type of DIMM may include non-volatile memory and at least some volatile memory and this third type of DIMM may be referred to as a non-volatile DIMM (NVDIMM).

Figure 2:
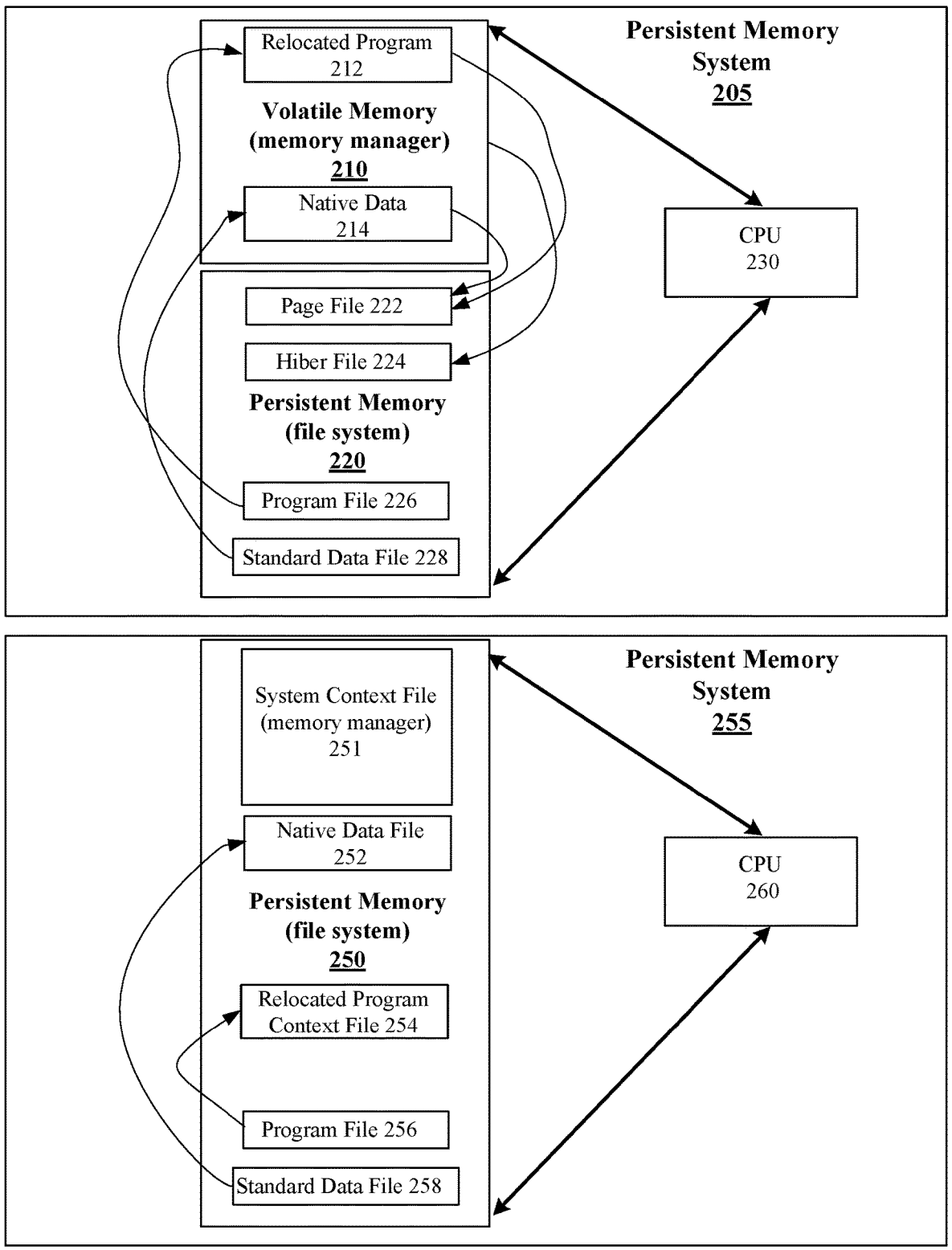
FIG. 2 illustrates an example comparison of persistent memory platforms.

FIG. 2 illustrates an example comparison of persistent memory systems. In some examples, as shown in FIG. 2, a first persistent memory system 205 includes a volatile memory 210 and a persistent memory 220 coupled with a CPU 230 and a second persistent memory system 255 includes a persistent memory 250 coupled with a CPU 260. As described more below, the comparison of the two types of persistent memory systems attempt to show distinct advantages to using a file system that may maintain files in only persistent memory and not rely on transformation between a persistent memory and a volatile memory.

According to some examples, persistent memory system 205 may be a type of persistent memory system that may allow direct mapped file systems which can be mapped in to context virtual address space and directly computed on with CPU instructions. However, applications or programs executed by CPU 230 may be in file formats designed for traditional storage when stored in a file system maintained in persistent memory 220. These file formats, even if mapped in to process virtual address space, only gain a reduction in one copy from storage to memory but continue to need transforms from flat sequential format files associated with traditional storage to a memory representation used by CPU 230 to execute applications or programs. For example, program file 226 stored to persistent memory 220 would have to be transformed to relocated program 212 when stored to volatile memory 210 for execution by CPU 230. For this example, to instantiate a process context for a program, code pages for program file 226 may be brought in to volatile memory 210 and transformed such that relocated program 212 includes resolution/relocation of references. Thus, there is no direct execution of program file 226. Rather, volatile memory 210 may be consumed to store relocated program 212 for executable code pages of the instantiated process context. On program termination, relocated program 212 and its associated workspace on volatile memory 210 may be released/loses state. An unplanned program termination may result in all work being lost, unless explicitly saved in files in persistent memory 220 per program design.

In some examples, program file 226 and standard data file 228 of persistent memory system 205 may be CPU instruction accessible by CPU 230. Even though program file 226 and standard data file 228 are CPU instruction accessible, they may use traditional file storage formats that do not hold code or data in a format that CPU 230 may natively compute with and will both need to be transformed to respective relocated program 212 and native data 214 when stored to volatile memory 210. Further, a relatively small volatile memory capacity compared to persistent memory 220 may result in volatile memory 210 being overcommitted by memory management software. Page file 222 may be used to temporarily as an overflow. Also, to preserve a volatile memory state in between power transitions, OS software for persistent memory system 205 (not shown) may copy memory state information to hiber file 224 maintained at persistent memory 220. The above operations may be memory to memory copies since both volatile memory 210 and persistent memory 220 are in CPU addressable system memory space. But the use of legacy storage formats for program file 226 and standard data file 228 may fail to exploit the full value of CPU instruction accessible persistent memory 220.

According to some examples, persistent memory system 225 may be designed such that it replaces volatile memory with a persistent memory file system that includes in-memory format files to allow for program executable, data and process contexts. Such a system may require a memory capacity in persistent memory 250 that is at least cumulative to the memory capacity of volatile memory 210 and persistent memory 220 for persistent memory system 205. For these examples, all memory for a persistent memory file system may be persistent memory and may be in a file system namespace. A memory manager for the persistent memory file system implemented in persistent memory 255 may continue to provide services of per context virtual address space mapping to physical memory pages. But the memory manager doesn't overcommit physical memory. Thus, no page file is needed. Also, system context file 251 maintains a memory state and is not subject to threat of loss due to power transitions as is possible with memory states maintained in the volatile memory of persistent memory system 205. Thus, no hiber file is needed for persistent memory system 255. Also, native data 214 maintained in a volatile state in volatile memory 210 of persistent memory system 205 may be backed by per process context files included in native data file 252 maintained in persistent memory 250 of persistent memory system 255. Also, program file 256 and standard data file 258 may need to be transformed only once to respective relocated program context file 254 and native data file 252 in a native format executable by CPU 260. Relocated program context file 254, in some examples, may be shared/reused in numerous instantiations having different contexts and thus is non-context specific. In comparison, reusing may not be possible when program file 226 is transformed and stored as relocated program 212 in volatile memory 210. Reuse may not be possible for persistent memory system 205 since a program termination may cause relocated program 212 and its associated workspace on volatile memory 210 to be released/lose state.

Figure 3:
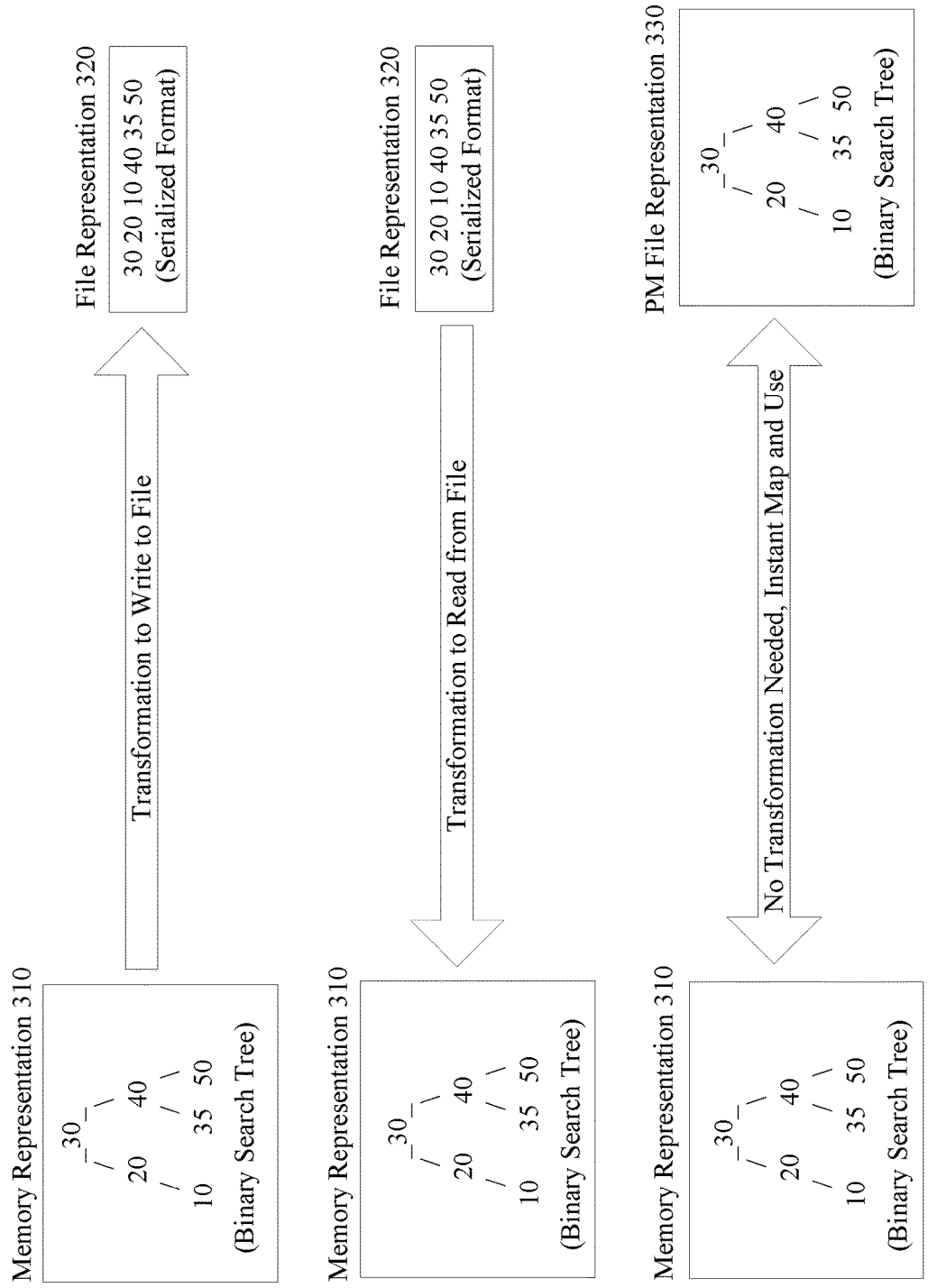
FIG. 3 illustrates an example representation.

FIG. 3 illustrates example representations 300. In some examples, as shown in FIG. 3, representations may include a memory representation 310, a file representation 320 and a persistent memory (PM) file representation 330. For these examples, memory representation 310 may be a memory representation of a binary search tree data structure having references or pointers tied to a state of a process instance or process context for applications (e.g., application(s) 115 of system 100) being executed by compute resources (e.g., circuitry 116 of system 100). Memory representation 310 may be based on these compute resources being arranged to operate using a cache line or byte address granularity access to maintain this representation in system memory.

According to some examples, file representation 320 may be an example of a serialized format of the binary search tree of memory representation 310 that may be needed to write memory representation 330 to a file using traditional storage file formats (e.g., when only a block address granularity is allowed over an input/output bus that may couple a storage memory device to the computing resources that generated memory representation 310). For these examples, memory representation 310 may undergo a transformation that may be referred to as serialization or marshalling. Also, when reading file representation 320, a de-serialization or de-marshalling is needed to transform file representation 320's serialized format to the binary search tree data structure of memory representation 310. The binary search tree for memory representation 310 shown in FIG. 3 is a relatively simple data structure. In some examples, far more complex data structures may require compute and/or system memory intensive serializations/de-serializations to transform to/from serialized formats.

According to some examples, PM file representation 330 may be formatted in an example file format to allow dynamic data such as references in the binary search tree included in memory representation 310 to be mapped to virtual addresses of a process virtual address space based on a reference or file offset. For these examples, no serialization or marshalling transformations may be needed to write or read memory representation 310 to or from a memory device of a persistent memory platform when PM file representation 330 is formatted in the example file format. In some examples, a given reference or file offset may be a starting offset based on which all references in the binary search tree of memory representation 310 may be mapped to virtual addresses of a process virtual address space.

In some examples, a compiler (e.g., compiler 114) may generate a reference or file offset for PM file representation 330 that may be associated with a pointer to a process virtual address space of one or more applications. For these examples, the compiler may generate the reference or file offset in relation to a file base (herein referred to as a "based pointer") to determine a starting offset for the references in the binary search tree of memory representation 310 when stored to PM file representation 330. Alternatively or in addition to a compiler, computing resources such as a CPU (e.g., circuitry 116) may support a view base register (e.g., base registers 117) and instructions to de-reference a based pointer for memory representation 310 when mapped from the process virtual address space to PM file representation 330.

Figure 4:
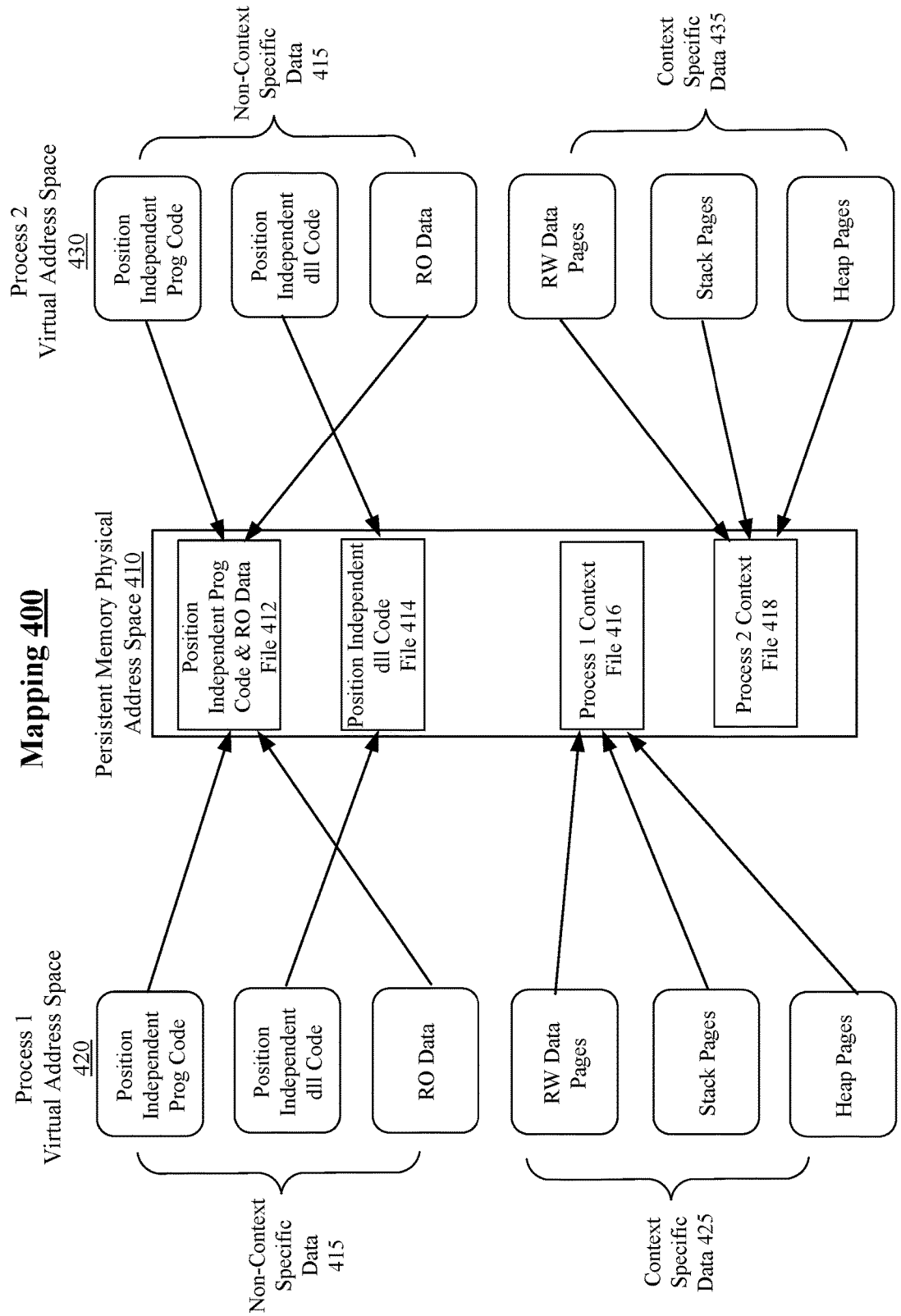
FIG. 4 illustrates a first example mapping.

FIG. 4 illustrates an example mapping 400. In some examples, mapping 400 may depict how execute in place (XIP) files with position independent code and read-only (RO) data may be conceptually mapped to a persistent memory physical address space 410 to execute in different process contexts. For these examples, programs may use XIP program files that hold code in a directly executable, native format that is directly executable by a CPU and non-context specific. For the example mapping 400, a portion of process 1 virtual address space 420 and a portion of process 2 virtual address space 430 may have references in the code that are relocatable so that the reference in the code may be mapped in to any context at different process virtual address spaces. For example, non-context specific data 415 for a first portion of process 1 virtual address space 420 and a first portion of process 2 virtual address space 430 that includes position independent program (prog) code, position independent dynamic link library (dll) code, or RO data may be mapped to references for files in persistent memory physical address space 410 (e.g., position independent prog code & RO data file 412 or position independent dll code file 414). The references in persistent memory physical address space 410 (e.g., determined by a file offset) may be position independent or relocatable to map these files to other memory addresses of persistent memory physical address space 410. Being position independent or relocatable allows non-context specific data 415 to be shared between the different process contexts associated with process 1 virtual address space 420 and process 2 virtual address space 430.

According to some examples, an instantiation or instance of a program by circuitry of a system may lead to a creation of a context file. Logic and/or features of a persistent memory platform (e.g., a memory manager) may store the context file to persistent memory physical address space 410 for use in the compute state for the instantiation of the program. For example, read write (RW) data pages, stack pages or heap pages included in context specific data 425 of a second portion of process 1 virtual address space 420 may be stored in process 1 context file 416 in persistent memory physical address space 410 and RW data pages, stack pages or heap pages included in context specific data 435 of a second portion of process 2 virtual address space 430 may be stored in process 2 context file 418 in persistent memory physical address space 410.

In some examples, upon creation of a new system or process context responsive to an instantiation of a program or application, a system such as system 100 shown in FIG. 1 may include logic and/or features at a persistent memory platform (e.g., persistent memory platform 112) to create a memory mapped file such as process 1 context file 416. For these examples, new persistent memory physical pages may be allocated for a first processing working set of the instantiation of the program. The new persistent memory physical pages may be obtained from free or available persistent memory physical address spaces among persistent memory physical address space 410. These new persistent memory physical pages, for example, may store context specific data for the first processing working set in process 1 context file 416. A similar allocation may occur responsive to another instantiation of the program or application that causes a second processing working set. The similar allocation may store context specific data for the second processing working set in process 2 context file 418. Process 1 context file 416 and process 2 context file 418 may both be stored in a CPU native format. Also, respective virtual to physical address mapping tables as well as all respective private (not shared) persistent memory physical address spaces among persistent memory physical address space 410 may be included in process 1 context file 416 and process 2 context file 418. This information may be tracked by respective context file metadata as an opaque set of pages that back process 1 context file 416 and process 2 context file 418. If process 1 context file 416 or process 2 context 418 map other files, only the address map pages may be included in process 1 context file 416 or process 2 context file 418. Physical pages of the mapped files are not copied in to process 1 context file 416 or process 2 context file 418.

According to some examples, context files such as process 1 context file 416 or process 2 context file 418 may be different from other types of files stored to persistent memory physical address space 410. The difference may be because these context files may be defined per circuity or CPU executing the program or application that caused an instantiation of the program or application that then led to creation of a given context file. Thus, the context files may need to hold a CPU register state for that circuitry or CPU as well as hold address mapping tables. These context files do not have shared pages with other files even as a restored context for a program or application instantiation could map to persistent memory physical address spaces from other shared files. Also, if the context file becomes corrupted or a run time context fails, then the context file can be deleted. On next application or program launch an instance of the context file may be recreated and mapped to persistent memory physical address space 410.

In some examples, one or more relocatable files may be used to store non-context specific data 415. For examples, the one or more relocatable files may include a relocatable file for position independent prog code & RO data file 412 and/or a relocatable file for position independent dll code file 414. These relocatable files may also be in a CPU native format. Position independent pointers or references (e.g., file offsets) in persistent memory physical address space 410 may allow these types of relocatable files that include non-context specific data to be used by different CPUs of a same CPU architecture. Also, relocatable files may have a run time mappable format created on a first load of a standard file associated with a program or application (e.g., a Word .doc file) to a system such as system 100. For example, logic and/or features at a persistent memory platform may transform the standard file to a PM file representation. The run time form file may be associated with the standard file by file system metadata. If an update to the run time form file needs to be updated back in to the standard file, the program or application may be arranged to support a mode that does a transform back to the standard file. This operation may be similar to how applications allow saving files in different file formats (e.g., saving to .doc or .pdf file formats).

Figure 5:
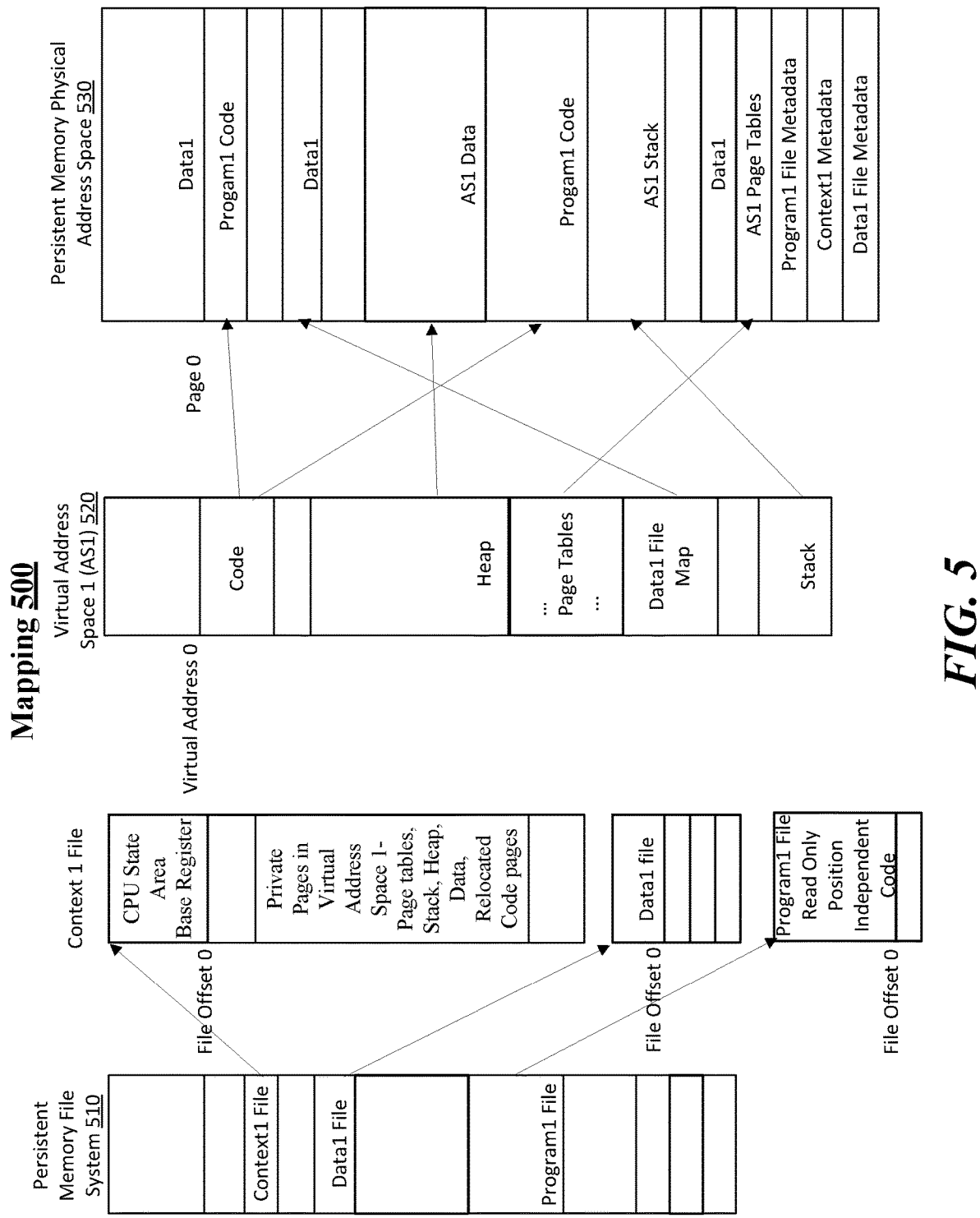
FIG. 5 illustrates a second example mapping.

FIG. 5 illustrates an example mapping 500. In some examples, mapping 500 depicts a more detailed mapping associated with persistent memory files. Mapping 400 shown in FIG. 4 showed various files mapped to what appears to be contiguous persistent memory physical memory address spaces of contiguous persistent memory physical memory address space 410. Mapping 500 shows a more realistic example of persistent memory direct mapped files of persistent memory file system 510 to contiguous virtual address spaces of virtual address space 1 (AS1) 520 that map to distributed physical pages in persistent memory physical address space 530. The mapping of virtual address spaces of virtual address space 1 (AS1) 520 to distributed physical pages in persistent memory physical address space 530 may or may not be to contiguous persistent memory physical memory address spaces.

According to some examples, context1 file, may have a file offset for a CPU register state that may be saved by an OS when an instantiation of a program that leads to the creation of the context1 file is stopped. The file offset may include a base register to locate a CPU register state within the context1 file in order to restore virtual address space 1 (AS1) 520 for run time access responsive to a restart of the instantiation of the program. The runtime access for the context1 file maintained in virtual address space 1 (AS1) 520 are shown in FIG. 5 as being mapped to the persistent memory physical address spaces of persistent memory physical address space 530.

In some examples, persistent context files such as those mentioned above for mapping 400 and mapping 500 may change application lifetimes. The application lifetimes are changed in that an application may be instantiated once, following which the application may be suspended or resumed in-place, as scheduled. Suspend and resume application flows may provide control to manage the program in any state beyond a CPU and memory state. In-place, directly executable, readable and modifiable persistent context files may all be in a compute native form. Also, for examples where a user may communicate information across different systems, the native form or format of the persistent context files may be transformed in to a standard format file. For example, a user takes a picture or video, all programs/applications using the picture or video (e.g., to edit, view, modify, etc.) with a same system can use the picture or video file in a compute native format. When sending the picture or video file to a different system (e.g., via email or upload) the picture or video file may be transformed from the compute native format to a standard file format such as .jpg or .mp4. This example is an improvement over today's use of files in only a standard format. The use of files in only the standard format requires all programs using the standard format, even on the same system, to transform the standard format to a compute native format and then transform back to the standard format at every program instantiation.

Figure 6:
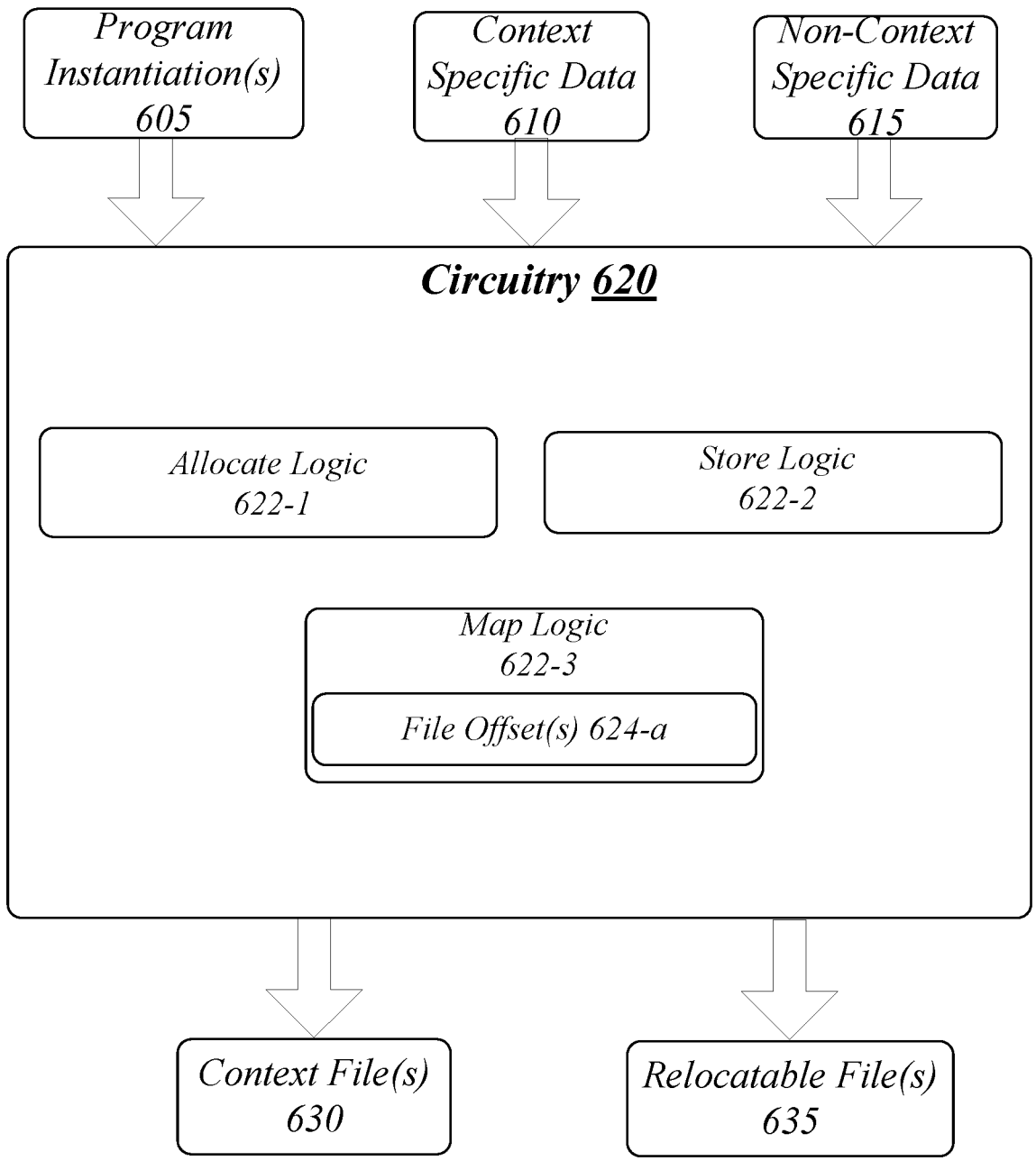
FIG. 6 illustrates an example apparatus.

FIG. 6 illustrates an example block diagram for an apparatus 600. Although apparatus 600 shown in FIG. 6 has a limited number of elements in a certain topology, it may be appreciated that the apparatus 600 may include more or less elements in alternate topologies as desired for a given implementation.

According to some examples, apparatus 600 may be supported by circuitry 620. For these examples, apparatus 600 may be used in connection with, maintained or located at a computing platform and may be arranged to execute or implement elements of a system such as system 100 shown in FIG. 1 and described above. Circuitry 620 may be arranged to execute one or more software or firmware implemented modules, components or logic 622-a (module, component or logic may be used interchangeably in this context). In other examples, circuitry 620 may be arranged to implement modules, components or logic 622-a that may be wholly or at least partially implemented in hardware (module, component or logic may also be used interchangeably in this context). It is worthy to note that "a" and "b" and "c" and similar designators as used herein are intended to be variables representing any positive integer. Thus, for example, if an implementation sets a value for a=3, then a complete set of modules, components or logic 622-a may include logic 622-1, 622-2 or 622-3. The examples presented are not limited in this context and the different variables used throughout may represent the same or different integer values. Also, "logic", "module" or "component" may also include software/firmware stored in computer-readable media, and although types of logic are shown in FIG. 6 as discrete boxes, this does not limit these types of logic to storage in distinct computer-readable media (e.g., a separate memory, etc.).

Circuitry 620 may be generally arranged to execute or implement one or more components, modules or logic 622-a. Circuitry 620 may be all or at least a part of any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples, circuitry 620 may be configured as an application specific integrated circuit (ASIC) and at least some components, modules or logic 622-a may be implemented as hardware elements of the ASIC. According to some examples, circuitry 620 may be configured as a field programmable gate array (FPGA) and at least some components, modules or logic 622-a may be implemented as hardware elements of the FPGA.

According to some examples, apparatus 600 may include an allocate logic 622-1. Allocate logic 622-1 may be executed or implemented by circuitry 620 to allocate a first portion of persistent memory physical pages of one or more memory devices of a persistent memory platform for a first processing working set of a first instantiation of a program. The allocated first portion of the persistent memory physical pages may be obtained from a persistent memory physical address space for the one or more memory devices. For these example, allocate logic 622-1 may allocate the first portion of persistent memory physical pages responsive to one or more instantiations of the program by at least a portion of circuitry 620 (e.g., a first CPU included in circuitry 620. The one or more instantiations of the program may be indicated or included in program instantiation(s) 605.

In some examples, apparatus 600 may also include a store logic 622-2. Store logic 622-2 may be executed or implemented by circuitry 620 to store context specific data for the first processing working set in a first context file, the first context file to include a first file offset to at least one persistent memory physical address space of the persistent physical memory address space. The first context file may be stored in a file format that is directly executable by first circuitry at the computing platform such as a first CPU. For these examples, the context specific data may be generated as a result of the first instantiation of the program and may be included in context specific data 610. Context specific data 610, in some examples, may include read write data pages, stack pages or heap pages associated with the first instantiation of the program by the first CPU. Also, the first context file may be included in context file(s) 630 that are stored to the one or more memory devices of the persistent memory platform.

According to some examples, apparatus 600 may also include a map logic 622-3. Map logic 622-3 may be executed or implemented by circuitry 620 map a first portion of a first process virtual address space for the first processing working set to the at least one persistent memory address space via use of the first file offset as a reference to the first context file. For these examples, file offset(s) 624-a may include the first file offset that was stored by store logic 622-2 with the first context file. File offset(s) 624-a may be maintained by map logic 622-3 in a data structure such as a lookup table (LUT).

In some examples, allocate logic 622-1 may also allocate a second portion of the persistent physical memory pages of the one or more memory devices of the persistent memory platform for the first processing working set of the first instantiation of the program. For these examples, the allocated second portion of the persistent memory physical pages may be obtained from the persistent memory physical address space. Store logic 622-2 may then store non-context specific data for the first processing working set in one or more relocatable files. The one or more relocatable file may separately include file offsets to respective persistent memory physical address spaces of the persistent physical memory address space. The one or more relocatable files may be stored in a file format that is directly executable by the first circuitry at the computing platform. The non-context specific data may be included in non-specific data 615. Non-specific data 615, in some examples, may include position independent program code for the program, position independent dynamic link library code for the program or read only data for the program. Also, the one or more relocatable files may be included in relocatable file(s) 635 that are stored to the one or more memory devices of the persistent memory platform. Map logic 622-3 may then map a second portion of the first process virtual address space for the first processing working set to the respective persistent memory address spaces via use of at least one of the file offsets as a reference to the one or more relocatable files. For these examples, file offset(s) 624-a may include at least one file offsets that was stored by store logic 622-2 with the one or more relocatable context files.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 7 illustrates an example logic flow 700. Logic flow 700 may be representative of some or all of the operations executed by one or more logic, features, or devices described herein, such as apparatus 600. More particularly, logic flow 700 may be implemented by allocate logic 622-1, store logic 622-2 or map logic 622-3 responsive to one or more instantiations of a program by circuitry used in connection with a computing platform coupled with a persistent memory platform.

According to some examples, logic flow 700 at block 702 may allocate a first portion of persistent memory physical pages of one or more memory devices of the persistent memory platform for a first processing working set of a first instantiation of the program, the allocated first portion of the persistent memory physical pages obtained from a persistent memory physical address space for the one or more memory devices. For these examples, allocate logic 622-1 may allocate the first portion of persistent memory physical pages.

In some examples, logic flow 700 at block 704 may store context specific data for the first processing working set in a first context file, the first context file including a first file offset to at least one persistent memory physical address space of the persistent physical memory address space, the first context file stored in a file format that is directly executable by a first circuitry at the computing platform. For these example, store logic 622-2 may store the context specific data in the first context file.

According to some examples, logic flow 700 at block 706 may map a first portion of a first process virtual address space for the first processing working set to the at least one persistent memory address space using the first file offset as a reference to the first context file. For these examples, map logic 622-3 may map the first portion of the first process virtual address space for the first processing working set.

In some examples, logic flow 700 at block 708 may allocate a second portion of the persistent physical memory pages of the one or more memory devices of the persistent memory platform for the first processing working set of the first instantiation of the program, the allocated second portion of the persistent memory physical pages obtained from the persistent memory physical address space. For these examples, allocate logic 622-1 may allocate the second portion of the persistent physical memory pages.

According to some examples, logic flow 700 at block 710 may store non-context specific data for the first processing working set in one or more relocatable files, the one or more relocatable file separately including file offsets to respective persistent memory physical address spaces of the persistent physical memory address space, the one or more relocatable files stored in a file format that is directly executable by the first circuitry at the computing platform. For these examples, store logic 622-2 may store the non-context specific data in the one or more relocatable files.

In some examples, logic flow 700 at block 712 may map a second portion of the first process virtual address space for the first processing working set to the respective persistent memory address spaces using at least one of the file offsets as a reference to the one or more relocatable files. For these examples, map logic 622-3 may map the second portion of the first process virtual address space for the first working set.

FIG. 8 illustrates an example storage medium 800. As shown in FIG. 8, the first storage medium includes a storage medium 800. The storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
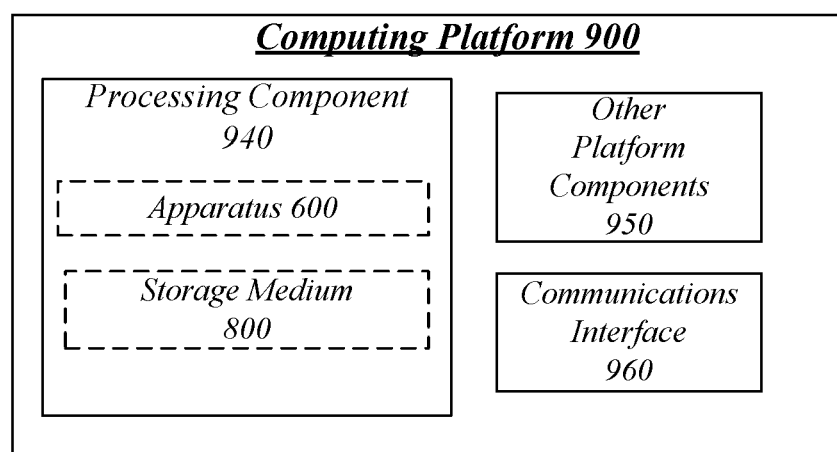
FIG. 9 illustrates an example computing platform.

FIG. 9 illustrates an example computing platform 900. In some examples, as shown in FIG. 9, computing platform 900 may include a processing component 940, other platform components 950 or a communications interface 960. According to some examples, computing platform 900 may be a computing platform having logic and/or features capable of allocating physical memory pages of memory devices of a persistent memory platform, storing context or relocated files to persistent memory physical address spaces and mapping process virtual address spaces for a working set associated with one or more instantiations of a program.

According to some examples, processing component 940 may execute processing operations or logic for apparatus 600 and/or storage medium 800. Processing component 940 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 950 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), RAM, DRAM, DDR DRAM, synchronous DRAM (SDRAM), DDR SDRAM, SRAM, programmable ROM (PROM), EPROM, EEPROM, flash memory, ferroelectric memory, SONOS memory, polymer memory such as ferroelectric polymer memory, nanowire, FeTRAM or FeRAM, ovonic memory, phase change memory, memristors, STT-MRAM, magnetic or optical cards, an array of devices such as Redundant Array of Independent Disks (RAID) drives, solid state memory devices (e.g., USB memory), solid state drives (SSD) and any other type of storage media suitable for storing information. In some examples, these types of memory units may be arranged as persistent memory and may be maintained in one or more DIMMs.

In some examples, communications interface 960 may include logic and/or features to support a communication interface. For these examples, communications interface 960 may include one or more communication interfaces that operate according to various communication protocols or standards to communicate over direct or network communication links. Direct communications may occur via use of communication protocols such as SMBus, PCIe, NVMe, QPI, SATA, SAS or USB communication protocols. Network communications may occur via use of communication protocols or standards related to IEEE 802.11, IEEE 802.3, iWARP, Infiniband, RoCE, SATA, SCSI, SAS. Network communication may also occur according to one or more OpenFlow specifications such as the OpenFlow Hardware Abstraction API Specification.

Computing platform 900 may be part of a computing device that may be, for example, user equipment, a computer, a personal computer (PC), a desktop computer, a laptop computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 900 described herein, may be included or omitted in various embodiments of computing platform 900, as suitably desired.

The components and features of computing platform 900 may be implemented using any combination of discrete circuitry, ASICs, logic gates and/or single chip architectures. Further, the features of computing platform 900 may be implemented using microcontrollers, programmable logic arrays and/or microprocessors or any combination of the foregoing where suitably appropriate. It is noted that hardware, firmware and/or software elements may be collectively or individually referred to herein as "logic", "feature", "component", "circuit" or "circuitry."

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

EXAMPLE 1

An example apparatus may include circuitry used in connection with a computing platform coupled with a persistent memory platform. The circuitry may execute logic that responsive to one or more instantiations of a program by the circuitry includes the logic to allocate a first portion of persistent memory physical pages of one or more memory devices of the persistent memory platform for a first processing working set of a first instantiation of the program. The allocated first portion of the persistent memory physical pages may be obtained from a persistent memory physical address space for the one or more memory devices. The logic may also store context specific data for the first processing working set in a first context file. The first context file may include a first file offset to at least one persistent memory physical address space of the persistent physical memory address space. The first context file may be stored in a file format that is directly executable by the first circuitry at the computing platform. The logic may also map a first portion of a first process virtual address space for the first processing working set to the at least one persistent memory address space via use of the first file offset as a reference to the first context file.

EXAMPLE 2

The apparatus of example 1, the context specific data for the first processing working set may include read write data pages, stack pages or heap pages associated with the first instantiation of the program by the first circuitry at the computing platform. The first circuity may include a first central processing unit.

EXAMPLE 3

The apparatus of example 1 the logic may also allocate a second portion of the persistent physical memory pages of the one or more memory devices of the persistent memory platform for the first processing working set of the first instantiation of the program. For these examples, the allocated second portion of the persistent memory physical pages may be obtained from the persistent memory physical address space. The logic may also store non-context specific data for the first processing working set in one or more relocatable files. The one or more relocatable file may separately include file offsets to respective persistent memory physical address spaces of the persistent physical memory address space. The one or more relocatable files may be stored in a file format that is directly executable by the circuitry at the computing platform. The logic may also map a second portion of the first process virtual address space for the first processing working set to the respective persistent memory address spaces via use of at least one of the file offsets as a reference to the one or more relocatable files.

EXAMPLE 4

The apparatus of example 3, the non-context specific data for the first processing working set may include position independent program code for the program, position independent dynamic link library code for the program or read only data for the program.

EXAMPLE 5

The apparatus of example 3, the logic to may also allocate a third portion of persistent memory physical pages of one or more memory devices of the persistent memory platform for a second processing working set of a second instantiation of the program. The allocated third portion of the persistent memory physical pages may be obtained from the persistent memory physical address space. The logic may also store context specific data for the second processing working set in a second context file. The second context file may include a second file offset to at least one persistent memory physical address space of the persistent physical memory address space. The second context file may be stored in a file format that is directly executable by the circuitry at the computing platform. The logic may also map a first portion of a second process virtual address space for the second processing working set to the at least one persistent memory address space via use of the second file offset as a reference to the second context file.

EXAMPLE 6

The apparatus of example 5, the context specific data for the second processing working set may include read write data pages, stack pages or heap pages associated with a second instantiation of the program by a second circuitry at the computing platform. For these examples, the second circuitry may include a second central processing unit.

EXAMPLE 7

The apparatus of example 5, the one or more relocatable files may be capable of being shared between the first processing working set and the second processing working set.

EXAMPLE 8

The apparatus of example 1, the persistent memory platform may be capable of storing the first context file such that the first context file continues to be accessible following a power loss to the persistent memory platform and the computing platform.

EXAMPLE 9

The apparatus of example 1, the one or more memory devices of the persistent memory platform may be maintained on at least one DIMM.

EXAMPLE 10

The apparatus of example 1, the one or more memory devices of the persistent memory platform including volatile or non-volatile memory.

EXAMPLE 11

The apparatus of example 10, the volatile memory comprising RAM, DRAM, DDR SDRAM, SRAM, thyristor RAM (T-RAM) or zero-capacitor RAM (Z-RAM).

EXAMPLE 12

The apparatus of example 10, the non-volatile memory may include phase change memory that uses chalcogenide phase change material, flash memory, single or multi-level PCM, nanowire memory, FeTRAM, anti-ferroelectric memory, resistive memory including a metal oxide base, CB-RAM, a spintronic magnetic junction memory, a MTJ memory, a domain wall (DW) and spin orbit transfer (SOT) memory, a thyristor based memory, a MRAM, or spin transfer torque MRAM (STT-MRAM).

EXAMPLE 13

The apparatus of example 1 may include one or more of a network interface communicatively coupled to the apparatus, a battery coupled to the apparatus, or a display communicatively coupled to the apparatus.

EXAMPLE 14

An example method may be implemented responsive to one or more instantiations of a program by circuitry used in connection with a computing platform coupled with a persistent memory platform. The method may include allocating a first portion of persistent memory physical pages of one or more memory devices of the persistent memory platform for a first processing working set of a first instantiation of the program. The allocated first portion of the persistent memory physical pages may be obtained from a persistent memory physical address space for the one or more memory devices. The method may also include storing context specific data for the first processing working set in a first context file, the first context file including a first file offset to at least one persistent memory physical address space of the persistent physical memory address space. The first context file may be stored in a file format that is directly executable by a first circuitry at the computing platform. The method may also include mapping a first portion of a first process virtual address space for the first processing working set to the at least one persistent memory address space using the first file offset as a reference to the first context file.

EXAMPLE 15

The method of example 14, the context specific data for the first processing working set may include read write data pages, stack pages or heap pages associated with the first instantiation of the program by the first circuitry at the computing platform. For these examples, the first circuitry may include a first central processing unit.

EXAMPLE 16

The method of example 14 may also include allocating a second portion of the persistent physical memory pages of the one or more memory devices of the persistent memory platform for the first processing working set of the first instantiation of the program. The allocated second portion of the persistent memory physical pages may be obtained from the persistent memory physical address space. The method may also include storing non-context specific data for the first processing working set in one or more relocatable files. The one or more relocatable file may separately include file offsets to respective persistent memory physical address spaces of the persistent physical memory address space. The one or more relocatable files may be stored in a file format that is directly executable by the circuitry at the computing platform. The method may also include mapping a second portion of the first process virtual address space for the first processing working set to the respective persistent memory address spaces using at least one of the file offsets as a reference to the one or more relocatable files.

EXAMPLE 17

The method of example 16, the non-context specific data for the first processing working set including position independent program code for the program, position independent dynamic link library code for the program or read only data for the program.

EXAMPLE 18

The method of example 16 also includes allocating a third portion of persistent memory physical pages of one or more memory devices of the persistent memory platform for a second processing working set of a second instantiation of the program. The allocated third portion of the persistent memory physical pages may be obtained from the persistent memory physical address space. The method may also include storing context specific data for the second processing working set in a second context file. The second context file may include a second file offset to at least one persistent memory physical address space of the persistent physical memory address space, the second context file stored in a file format that is directly executable by the circuitry at the computing platform. The method may also include mapping a first portion of a second process virtual address space for the second processing working set to the at least one persistent memory address space using the second file offset as a reference to the second context file.

EXAMPLE 19

The method of example 18, the context specific data for the second processing working set including read write data pages, stack pages or heap pages associated with the second instantiation of the program by a second circuitry at the computing platform. For these examples, the second circuity may include a second central processing unit.

EXAMPLE 20

The method of example 18, the one or more relocatable files may be capable of being shared between the first processing working set and the second processing working set.

EXAMPLE 21

The method of example 14, the persistent memory platform may be capable of storing the first context file such that the first context file continues to be accessible following a power loss to the persistent memory platform and the computing platform.

EXAMPLE 22

The method of example 14, the one or more memory devices of the persistent memory platform may be maintained on at least one DIMM.

EXAMPLE 23

The method of example 14, the one or more memory devices of the persistent memory platform may include volatile or non-volatile memory.

EXAMPLE 24

The method of example 23, the volatile memory may include RAM, DRAM, DDR SDRAM, SRAM, thyristor RAM (T-RAM) or zero-capacitor RAM (Z-RAM).

EXAMPLE 25

The method of example 23, the non-volatile memory may include phase change memory that uses chalcogenide phase change material, flash memory, single or multi-level PCM, nanowire memory, FeTRAM, anti-ferroelectric memory, resistive memory including a metal oxide base, CB-RAM, a spintronic magnetic junction memory, a MTJ memory, a domain wall (DW) and spin orbit transfer (SOT) memory, a thyristor based memory, a MRAM, or spin transfer torque MRAM (STT-MRAM).

EXAMPLE 26

An example at least one machine readable medium may include a plurality of instructions that in response to being executed by a system may cause the system to carry out a method according to any one of examples 14 to 25.

EXAMPLE 27

An example apparatus may include means for performing the methods of any one of examples 13 to 24.

EXAMPLE 28

An example at least one machine readable medium may include a plurality of instructions that in response to being executed by a system used in connection with a computing platform coupled with a persistent memory platform may cause the system to allocate, responsive to one or more instantiations of a program by first circuitry at the computing platform, a first portion of persistent memory physical pages of one or more memory devices of the persistent memory platform for a first processing working set of a first instantiation of the program. The allocated first portion of the persistent memory physical pages may be obtained from a persistent memory physical address space for the one or more memory devices. The instructions may also cause the system to store context specific data for the first processing working set in a first context file. The first context file may include a first file offset to at least one persistent memory physical address space of the persistent physical memory address space. The first context file may be stored in a file format that is directly executable by the first circuitry at the computing platform. The instructions may also cause the system to map a first portion of a first process virtual address space for the first processing working set to the at least one persistent memory address space via use of the first file offset as a reference to the first context file.

EXAMPLE 29

The at least one machine readable medium of example 28, the context specific data for the first processing working set may include read write data pages, stack pages or heap pages associated with the first instantiation of the program by the first circuitry at the computing platform, the first circuitry including a first central processing unit.

EXAMPLE 30

The at least one machine readable medium of example 28, the instructions may further cause the system to allocate a second portion of the persistent physical memory pages of the one or more memory devices of the persistent memory platform for the first processing working set of the first instantiation of the program. The allocated second portion of the persistent memory physical pages may be obtained from the persistent memory physical address space. The instructions may also cause the system to store non-context specific data for the first processing working set in one or more relocatable files. The one or more relocatable file may separately include file offsets to respective persistent memory physical address spaces of the persistent physical memory address space. The one or more relocatable files may be stored in a file format that is directly executable by the circuitry at the computing platform. The instructions may also cause the system to map a second portion of the first process virtual address space for the first processing working set to the respective persistent memory address spaces via use of at least one of the file offsets as a reference to the one or more relocatable files.

EXAMPLE 31

The at least one machine readable medium of example 29, the instructions may further cause the system to allocate a third portion of persistent memory physical pages of one or more memory devices of the persistent memory platform for a second processing working set of a second instantiation of the program. The allocated third portion of the persistent memory physical pages may be obtained from the persistent memory physical address space. The instructions may also cause the system to store context specific data for the second processing working set in a second context file. The second context file may include a second file offset to at least one persistent memory physical address space of the persistent physical memory address space. The second context file may be stored in a file format that is directly executable by the circuitry at the computing platform. The instructions may also cause the system to map a first portion of a second process virtual address space for the second processing working set to the at least one persistent memory address space via use of the second file offset as a reference to the second context file.

EXAMPLE 32

The at least one machine readable medium of example 31, the context specific data for the second processing working set may include read write data pages, stack pages or heap pages associated with the second instantiation of the program by a second circuitry at the computing platform, the second circuity to include a second central processing unit.

EXAMPLE 33

The at least one machine readable medium of example 31, the one or more relocatable files may be capable of being shared between the first processing working set and the second processing working set.

EXAMPLE 34

The at least one machine readable medium of example 28, the persistent memory platform may be capable of storing the first context file such that the first context file continues to be accessible following a power loss to the persistent memory platform and the computing platform.

EXAMPLE 35

The at least one machine readable medium of example 28, the one or more memory devices of the persistent memory platform may be maintained on at least one DIMM.

EXAMPLE 36

The at least one machine readable medium of example 28, the one or more memory devices may include volatile or non-volatile memory.

EXAMPLE 37

The at least one machine readable medium of example 36, the volatile memory may include RAM, DRAM, DDR SDRAM, SRAM, thyristor RAM (T-RAM) or zero-capacitor RANI (Z-RAM).

EXAMPLE 38

The at least one machine readable medium of example 36, the non-volatile memory may include phase change memory that uses chalcogenide phase change material, flash memory, single or multi-level PCM, nanowire memory, FeTRAM, anti-ferroelectric memory, resistive memory including a metal oxide base, CB-RAM, a spintronic magnetic junction memory, a MTJ memory, a domain wall (DW) and spin orbit transfer (SOT) memory, a thyristor based memory, a MRAM, or spin transfer torque MRAM (STT-MRAM).

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
    circuitry used in connection with a computing platform coupled with a persistent memory platform, the circuitry to execute logic that responsive to one or more instantiations of a program by circuitry at the computing platform includes the logic to:
        allocate a first portion of persistent memory physical pages of one or more memory devices of the persistent memory platform for a first processing working set of a first instantiation of the program, the allocated first portion of the persistent memory physical pages obtained from a persistent memory physical address space for the one or more memory devices;
        store context specific data for the first processing working set in a first context file in the allocated first portion of the persistent memory physical pages, the first context file to include a first file offset to at least one persistent memory physical address space of the persistent physical memory address space, the first context file stored in a file format that is directly executable by a first circuitry at the computing platform; and
        map a first portion of a first process virtual address space for the first processing working set to the at least one persistent memory address space via use of the first file offset as a reference to the first context file.

2. The apparatus of claim 1, comprising the context specific data for the first processing working set to include read write data pages, stack pages or heap pages associated with the first instantiation of the program by the first circuitry at the computing platform, the first circuitry including a first central processing unit.

3. The apparatus of claim 1 further comprising the logic to:
    allocate a second portion of the persistent physical memory pages of the one or more memory devices of the persistent memory platform for the first processing working set of the first instantiation of the program, the allocated second portion of the persistent memory physical pages obtained from the persistent memory physical address space;
    store non-context specific data for the first processing working set in one or more relocatable files in the allocated second portion of the persistent memory physical pages, the one or more relocatable file to separately include file offsets to respective persistent memory physical address spaces of the persistent physical memory address space, the one or more relocatable files stored in a file format that is directly executable by the first circuitry at the computing platform; and
    map a second portion of the first process virtual address space for the first processing working set to the respective persistent memory address spaces via use of at least one of the file offsets as a reference to the one or more relocatable files.

4. The apparatus of claim 3, comprising the non-context specific data for the first processing working set to include position independent program code for the program, position independent dynamic link library code for the program or read only data for the program.

5. The apparatus of claim 3, further comprising the logic to:
    allocate a third portion of persistent memory physical pages of one or more memory devices of the persistent memory platform for a second processing working set of a second instantiation of the program, the allocated third portion of the persistent memory physical pages obtained from the persistent memory physical address space;
    store context specific data for the second processing working set in a second context file in the allocated third portion of the persistent memory physical pages, the second context file to include a second file offset to at least one persistent memory physical address space of the persistent physical memory address space, the second context file stored in a file format that is directly executable by a second circuitry at the computing platform; and
    map a first portion of a second process virtual address space for the second processing working set to the at least one persistent memory address space via use of the second file offset as a reference to the second context file.

6. The apparatus of claim 5, comprising the context specific data for the second processing working set to include read write data pages, stack pages or heap pages associated with the second instantiation of the program by the second circuitry at the computing platform, the second circuitry to include a second central processing unit.

7. The apparatus of claim 5, comprising the one or more relocatable files capable of being shared between the first processing working set and the second processing working set.

8. The apparatus of claim 5, comprising the circuitry to execute the logic includes the first circuitry at the computing platform or the second circuitry at the computing platform.

9. The apparatus of claim 1, further comprising the computing platform.

10. The apparatus of claim 1, further comprising the persistent memory platform.

11. The apparatus of claim 10, the persistent memory platform further comprising at least one dual in-line memory module (DIMM), the one or more memory devices of the persistent memory platform maintained on the at least one DIMM.

12. The apparatus of claim 10, comprising the one or more memory devices of the persistent memory platform including volatile or non-volatile memory, wherein the volatile memory includes random-access memory (RAM), Dynamic RAM (DRAM), double data rate synchronous dynamic RAM (DDR SDRAM), static random-access memory (SRAM), thyristor RAM (T-RAM) or zero-capacitor RAM (Z-RAM) and wherein the non-volatile memory includes phase change memory that uses chalcogenide phase change material, flash memory, single or multi-level phase change memory (PCM), nanowire memory, ferroelectric transistor random access memory (FeTRAM), anti-ferroelectric memory, resistive memory including a metal oxide base, an oxygen vacancy base and a conductive bridge random access memory (CB-RAM), a spintronic magnetic junction memory, a magnetic tunneling junction (MTJ) memory, a domain wall (DW) and spin orbit transfer (SOT) memory, a thyristor based memory, a magnetoresistive random access memory (MRAM) that incorporates memristor technology, spin transfer torque MRAM (STT-MRAM).

13. A method implemented responsive to one or more instantiations of a program by circuitry used in connection with a computing platform coupled with a persistent memory platform, the method comprising:
allocating a first portion of persistent memory physical pages of one or more memory devices of the persistent memory platform for a first processing working set of a first instantiation of the program in the allocated first portion of the persistent memory physical pages, the allocated first portion of the persistent memory physical pages obtained from a persistent memory physical address space for the one or more memory devices;
storing context specific data for the first processing working set in a first context file, the first context file including a first file offset to at least one persistent memory physical address space of the persistent physical memory address space, the first context file stored in a file format that is directly executable by a first circuitry at the computing platform; and
mapping a first portion of a first process virtual address space for the first processing working set to the at least one persistent memory address space using the first file offset as a reference to the first context file.

14. The method of claim 13, comprising the context specific data for the first processing working set including read write data pages, stack pages or heap pages associated with the first instantiation of the program by the first circuitry at the computing platform, the first circuitry including a first central processing unit.

15. The method of claim 14, further comprising:
allocating a second portion of the persistent physical memory pages of the one or more memory devices of the persistent memory platform for the first processing working set of the first instantiation of the program, the allocated second portion of the persistent memory physical pages obtained from the persistent memory physical address space;
storing non-context specific data for the first processing working set in one or more relocatable files in the allocated second portion of the persistent memory physical pages, the one or more relocatable file separately including file offsets to respective persistent memory physical address spaces of the persistent physical memory address space, the one or more relocatable files stored in a file format that is directly executable by the first circuitry at the computing platform; and
mapping a second portion of the first process virtual address space for the first processing working set to the respective persistent memory address spaces using at least one of the file offsets as a reference to the one or more relocatable files.

16. The method of claim 15, comprising the non-context specific data for the first processing working set including position independent program code for the program, position independent dynamic link library code for the program or read only data for the program.

17. The method of claim 15, further comprising:
allocating a third portion of persistent memory physical pages of one or more memory devices of the persistent memory platform for a second processing working set of a second instantiation of the program, the allocated third portion of the persistent memory physical pages obtained from the persistent memory physical address space;
storing context specific data for the second processing working set in a second context file in the allocated third portion of the persistent memory physical pages, the second context file including a second file offset to at least one persistent memory physical address space of the persistent physical memory address space, the second context file stored in a file format that is directly executable by a first circuitry at the computing platform; and
mapping a first portion of a second process virtual address space for the second processing working set to the at least one persistent memory address space using the second file offset as a reference to the second context file.

18. The method of claim 17, comprising the context specific data for the second processing working set including read write data pages, stack pages or heap pages associated with the second instantiation of the program by a second circuitry at the computing platform, the second circuitry including a second central processing unit.

19. The method of claim 17, comprising the one or more relocatable files capable of being shared between the first processing working set and the second processing working set.

20. The method of claim 13, comprising the persistent memory platform capable of storing the first context file such that the first context file continues to be accessible following a power loss to the persistent memory platform and the computing platform.

21. At least one machine readable medium comprising a plurality of instructions that in response to being executed by a system used in connection with a computing platform coupled with a persistent memory platform cause the system to:
allocate, responsive to one or more instantiations of a program by circuitry at the computing platform, a first portion of persistent memory physical pages of one or more memory devices of the persistent memory platform for a first processing working set of a first instantiation of the program, the allocated first portion of the persistent memory physical pages obtained from a persistent memory physical address space for the one or more memory devices;

store context specific data for the first processing working set in a first context file in the allocated first portion of the persistent memory physical pages, the first context file to include a first file offset to at least one persistent memory physical address space of the persistent physical memory address space, the first context file stored in a file format that is directly executable by a first circuitry at the computing platform; and map a first portion of a first process virtual address space for the first processing working set to the at least one persistent memory address space via use of the first file offset as a reference to the first context file.

22. The at least one machine readable medium of claim 21, comprising the context specific data for the first processing working set to include read write data pages, stack pages or heap pages associated with the first instantiation of the program by the first circuitry at the computing platform, the first circuitry including a first central processing unit.

23. The at least one machine readable medium of claim 21, comprising the instructions to further cause the system to:

allocate a second portion of the persistent physical memory pages of the one or more memory devices of the persistent memory platform for the first processing working set of the first instantiation of the program, the allocated second portion of the persistent memory physical pages obtained from the persistent memory physical address space;

store non-context specific data for the first processing working set in one or more relocatable files in the allocated second portion of the persistent memory physical pages, the one or more relocatable file to separately include file offsets to respective persistent memory physical address spaces of the persistent physical memory address space, the one or more relocatable files stored in a file format that is directly executable by the first circuitry at the computing platform; and map a second portion of the first process virtual address space for the first processing working set to the respective persistent memory address spaces via use of at least one of the file offsets as a reference to the one or more relocatable files.

24. The at least one machine readable medium of claim 23, comprising the instructions to further cause the system to:

allocate a third portion of persistent memory physical pages of one or more memory devices of the persistent memory platform for a second processing working set of a second instantiation of the program, the allocated third portion of the persistent memory physical pages obtained from the persistent memory physical address space;

store context specific data for the second processing working set in a second context file in the allocated third portion of the persistent memory physical pages, the second context file to include a second file offset to at least one persistent memory physical address space of the persistent physical memory address space, the second context file stored in a file format that is directly executable by a second circuitry at the computing platform; and map a first portion of a second process virtual address space for the second processing working set to the at least one persistent memory address space via use of the second file offset as a reference to the second context file.

25. The at least one machine readable medium of claim 24, comprising the context specific data for the second processing working set to include read write data pages, stack pages or heap pages associated with the second instantiation of the program by the second circuitry at the computing platform, the second circuitry to include a second central processing unit.

26. The at least one machine readable medium of claim 24, comprising the one or more relocatable files capable of being shared between the first processing working set and the second processing working set.

* * * * *